(12) United States Patent
Susarla et al.

(10) Patent No.: US 9,779,004 B2
(45) Date of Patent: Oct. 3, 2017

(54) METHODS AND SYSTEMS FOR REAL-TIME ACTIVITY TRACING IN A STORAGE ENVIRONMENT

(71) Applicant: NETAPP, INC., Sunnyvale, CA (US)

(72) Inventors: Sai Rama Krishna Susarla, Bangalore (IN); Joseph G. Moore, Wichita, KS (US); Gerald James Fredin, Wichita, KS (US)

(73) Assignee: NETAPP, INC., Sunnyvale, CA (US)

( * ) Notice: Subject to any disclaimer, the term of this patent is extended or adjusted under 35 U.S.C. 154(b) by 126 days.

(21) Appl. No.: 14/665,304

(22) Filed: Mar. 23, 2015

(65) Prior Publication Data
US 2016/0283340 A1  Sep. 29, 2016

(51) Int. Cl.
| | |
|---|---|
| *G06F 3/06* | (2006.01) |
| *G06F 11/30* | (2006.01) |
| *G06F 13/38* | (2006.01) |
| *H04L 12/26* | (2006.01) |

(52) U.S. Cl.
CPC .......... *G06F 11/3034* (2013.01); *G06F 3/061* (2013.01); *G06F 3/0619* (2013.01); *G06F 3/0665* (2013.01); *G06F 3/0689* (2013.01); *G06F 11/3048* (2013.01); *H04L 43/028* (2013.01); *H04L 43/0811* (2013.01); *H04L 43/0817* (2013.01)

(58) Field of Classification Search
None
See application file for complete search history.

(56) References Cited

U.S. PATENT DOCUMENTS

| | | | |
|---|---|---|---|
| 7,953,878 B1 | 5/2011 | Trimble | |
| 8,040,811 B2 * | 10/2011 | Edwards | ................ H04L 41/22 370/241 |
| 8,914,480 B1 | 12/2014 | Jones et al. | |

(Continued)

OTHER PUBLICATIONS

PCT International Searching Authority, Notification of Transmittal of the International Search Report and the Written Opinion of the International Searching Authority, or the Declaration, Application No. PCT/US2016/0023639 mailed Jun. 10, 2016, 9 pages.

(Continued)

*Primary Examiner* — Scott Sun
(74) *Attorney, Agent, or Firm* — Haynes and Boone, LLP; Thomas Kelton; R. Whitman Burns

(57) ABSTRACT

Systems and methods for efficient input/output (I/O) workload capture are provided. For example, in one aspect, a machine implemented method includes: opening a network socket for listening to a connection request from a computing device; accepting the connection request from the computing device over the network socket; enabling selective data collection based on a network connection with the computing device over the network socket, where the network connection based selective data collection includes obtaining information regarding a plurality of input/output (I/O) requests and responses and performance information of a storage server for processing the I/O requests; sub-sampling the network connection based collected data; and sending at least a portion of the network connection based collected data over the network socket connection to the computing device.

20 Claims, 6 Drawing Sheets

(56) References Cited

U.S. PATENT DOCUMENTS

| | | |
|---|---|---|
| 2003/0212801 A1 | 11/2003 | Yang-Huffman |
| 2005/0076341 A1 | 4/2005 | Bauman et al. |
| 2005/0210096 A1 | 9/2005 | Bishop et al. |
| 2006/0173854 A1 | 8/2006 | Ottaviani et al. |
| 2007/0050591 A1 | 3/2007 | Boyd et al. |
| 2011/0270966 A1* | 11/2011 | Zhou ............... H04L 43/045 709/224 |
| 2013/0091266 A1* | 4/2013 | Bhave ............ G06F 11/3476 709/224 |
| 2013/0326033 A1 | 12/2013 | Gomez |

OTHER PUBLICATIONS

Hewlett Packard. Unix Command Equivalents Reference Card. 2003. [retrieved on May 18, 2016] Retrieved from the internet: URL:http://h20565.www2.h pe.com/h psc/doc/public/display?docId=emr_na-c04623358, 6 pages.

* cited by examiner

METHODS AND SYSTEMS FOR REAL-TIME ACTIVITY TRACING IN A STORAGE ENVIRONMENT

TECHNICAL FIELD

The present disclosure relates to storage systems, and more particularly, to collecting information regarding workloads executed by storage systems.

BACKGROUND

A storage server is a processing system that is used to store and retrieve data on behalf of one or more computing systems (also referred to as "hosts" or host computing systems) in a network. The storage server operates on behalf of computer systems to store and manage data in a set of mass storage devices, e.g., magnetic or optical storage-based disks, solid state devices, or tapes. Some storage servers are designed to service file-level requests from hosts, as is commonly the case with file servers used in network attached storage (NAS) environments. Other storage servers are designed to service block-level requests from hosts, as with storage controllers used in a storage area network (SAN) environment. Still other storage servers are capable of servicing both file-level requests and block-level requests.

In order to evaluate and improve storage server (or storage system) performance, it is helpful to collect data regarding workloads that are handled by the storage server. The term workload as used herein means processing of input/output (I/O) requests for reading and writing information from and to storage devices. Continuous efforts are being made to efficiently collect workload information.

SUMMARY

Various systems, methods, and machine-readable media are disclosed herein for real-time activity tracing in a storage environment. For example, in one aspect, a machine implemented method includes: opening a network socket for listening to a connection request from a computing device; accepting the connection request from the computing device over the network socket; enabling selective data collection based on a network connection with the computing device over the network socket, where the network connection based selective data collection includes obtaining information regarding a plurality of input/output (I/O) requests and responses and performance information of a storage server for processing the I/O requests; sub-sampling the network connection based collected data; and sending at least a portion of the network connection based collected data over the network socket connection to the computing device.

According to another aspect, a non-transitory, machine-readable storage medium having stored thereon instructions for performing a method is disclosed, wherein the instructions comprise machine executable code which when executed by at least one machine, causes the machine to: open a network socket for listening to a connection request from a computing device; accept the connection request from the computing device over the network socket; enable selective data collection based on a network connection with the computing device over the network socket, where the network connection based selective data collection includes obtaining information regarding a plurality of input/output (I/O) requests and responses and performance information of a storage server for processing the I/O requests; sub-sample the network connection based collected data; and send at least a portion of the network connection based collected data over the network socket connection to the computing device.

In yet another aspect, a system is disclosed that includes: a memory containing machine readable medium comprising machine executable code having stored thereon instructions; and a processor module coupled to the memory, the processor module configured to execute the machine executable code to: open a network socket for listening to a connection request from a computing device; accept the connection request from the computing device over the network socket; enable selective data collection based on a network connection with the computing device over the network socket, where the network connection based selective data collection includes obtaining information regarding a plurality of input/output (I/O) requests and responses and performance information of a storage server for processing the I/O requests; sub-sample the network connection based collected data; and send at least a portion of the network connection based collected data over the network socket connection to the computing device.

This brief summary has been provided so that the nature of this disclosure may be understood quickly. A more complete understanding of the disclosure can be obtained by reference to the following detailed description of the various aspects thereof in connection with the attached drawings.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

Figure 1:
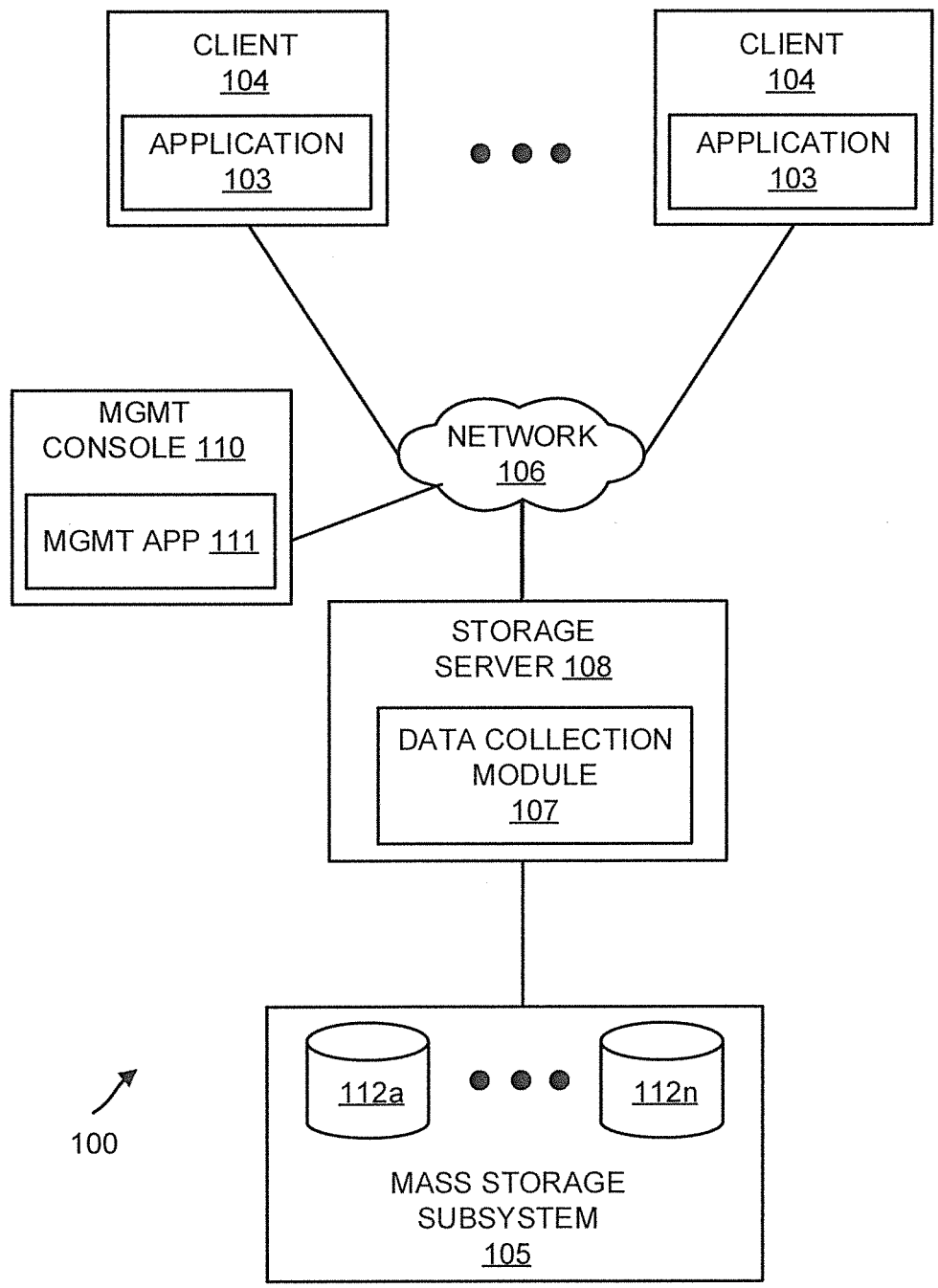
FIG. 1 shows an example of a networked storage system, used according to various aspects of the present disclosure.

As a preliminary note, the terms "component", "module", "system," and the like as used in this disclosure are intended to refer to a computer-related entity, either programmable instructions-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, flash memory device or any other non-volatile memory device, or any other storage device, in accordance with the claimed subject matter.

It is desirable that active storage servers be disrupted as little as possible so that most resources are dedicated to the storage server's primary tasks of storing and retrieving information. It is also very useful to track and analyze real-time or near real-time workload data of storage servers (or systems). As such, a workload capture mechanism that minimizes storage server-side setup and overhead and is flexible enough to support agile real-time analytics and tuning is disclosed herein.

Systems and methods are provided for a storage server (may also be referred to as a storage controller) to efficiently capture workload data for a management console or other client for analysis. In some aspects, data that needs to be collected is sub-sampled which reduces the impact of data collection on computing resources, such as network communications. Various other aspects help provide high integrity data tracking while limiting the resource burden on storage server resources. In general, it is desirable to have an "always on" workload capture capability while trying to reduce consumption of an active storage server's resources—including storage space, buffer cache, and input/output (I/O) bandwidth, as described below in detail.

Aspects of the disclosure herein can also be applied to consolidate workload data in multiple storage server environments. In general, systems and methods are provided that capture I/O workload data and pass it to a management console or other interested client device over a network connection, where that network connection preferably avoids interfering with standard I/O operations handled by a storage server.

System 100: FIG. 1 is a block diagram illustrating an example a networked system (or configuration) 100 in which the technology introduced herein can be implemented. The configuration described with respect to FIG. 1 is for illustration of a type of configuration in which the technology described herein can be implemented. As would be recognized by one skilled in the art, other network storage configurations could be used for implementing the technology disclosed herein.

As illustrated in the example of FIG. 1, the network storage system 100 includes multiple client computing systems (may also be referred to as clients or client systems) 104, a storage server 108, a management console 110, and a network 106 connecting them all. The storage server 108 is coupled to a number of mass storage devices (or storage containers) 112a-112n (may be referred to as storage device or storage devices 112) in a mass storage subsystem 105. Some or all of the mass storage devices 112 can be various types of storage devices, e.g., hard disk drives (HDDs), flash memory, solid-state drives (SSDs), hybrid storage drives (sometimes referred to as SSHDs), optical drives, tape storage, etc. For ease of description, the storage devices 112 are discussed as disks herein. However as would be recognized by one skilled in the art, other types of storage devices could be used.

Although illustrated as distributed systems, in some aspects the storage server 108 and the mass storage subsystem 105 can be physically contained and/or otherwise located in the same enclosure. For example, the storage server 108 and the mass storage subsystem 105 can together be one of the E-series storage system products available from NetApp®, Inc., the assignee of the present application. The E-series storage system products can include one or more embedded controllers (or storage servers) and disks. Furthermore, the storage system can, in some aspects, include a redundant pair of controllers that can be located within the same physical enclosure with the disks. In another aspect, the storage server 108 can be, for example, one of the FAS-series of storage server products available from NetApp®, Inc.

The storage server 108 may also be connected to other storage systems and/or to disks within or outside of the enclosure via a serial attached SCSI (SAS)/Fibre Channel (FC) protocol. Other protocols for communication are also possible including combinations and/or variations thereof.

The client computing systems 104 may be connected to the storage server 108 via the network 106, which can be a packet-switched network, for example, a local area network (LAN) or a wide area network (WAN), a storage area network (SAN), a converged network, combinations of the same, or the like. The various aspects of the present disclosure are not limited to any particular network type.

Further, the storage server 108 can be connected to the storage devices 112 via a switching fabric (not illustrated), which can be a fiber distributed data interface (FDDI) network, for example. It is noted that, within the network data storage environment, any other suitable number of storage servers and/or mass storage devices, and/or any other suitable network technologies, may be employed.

The storage server 108 can make some or all of the storage space on the storage devices 112 available to the client systems 104 in a conventional manner. For example, each of the storage devices 112 can be implemented as an individual disk, multiple disks (e.g., a Redundant Array of Independent (or Inexpensive) Disks (RAID) group) or any other suitable mass storage device(s) including combinations and/or variations thereof. Storage of information in the mass storage subsystem 105 can be implemented as one or more storage volumes that comprise a collection of physical storage devices 112 cooperating to define an overall logical arrangement of volume block number (VBN) space on the volume(s). Each logical volume is generally, although not necessarily, associated with its own file system either in the client for a SAN device or in the storage server 108 for a NAS device.

The storage devices within a logical volume/file system are typically organized as one or more groups, wherein each group may be operated as a RAID. Most RAID implementations, e.g., a RAID-6 level implementation, enhance the reliability/integrity of data storage through the redundant writing of data "stripes" across a given number of physical disks in the RAID group, and the appropriate storing of data protection information with respect to the striped data.

The storage server 108 can receive and respond to read and write requests (i.e. I/O requests) from applications 103 executed by the client systems 104, directed to data stored in or to be stored in the storage subsystem 105. Applications 103 may be an email application, a database application, a management application and any other application type.

Although the storage server 108 is illustrated as a single unit in FIG. 1, it can have a distributed architecture. For example, the storage server 108 can be designed as a physically separate network module (e.g., "N-blade") and disk module (e.g., "D-blade") (not illustrated), which communicate with each other over a physical interconnect. Such an architecture allows convenient scaling, e.g., by deploying two or more N-blades and D-blades, all capable of communicating with each other through the physical interconnect.

The storage server 108 can be configured to implement one or more virtual storage servers. Virtual storage servers allow the sharing of the underlying physical storage controller resources, (e.g., processors and memory, between virtual storage servers while allowing each virtual storage server to run its own operating system) thereby providing functional isolation. With this configuration, multiple server operating systems that previously ran on individual servers, (e.g., to avoid interference) are able to run on the same physical server because of the functional isolation provided by a virtual storage server implementation. This can be a cost effective way of providing storage server solutions to multiple customers than providing separate physical servers for each customer.

As illustrated in the example of FIG. 1, the network storage system 100 also includes the management console 110 that executes one or more management applications 111 to configure, monitor, upgrade, and/or rectify errors in storage server 108 and any of the system 100 resources. For example, a system administrator may utilize the management application 111 to obtain information regarding storage server activity. The information collected by the management application 111 may be used to take corrective or pro-active action.

Further, in one aspect, storage server 108 includes a data collection module 107 that is configured to collect information regarding incoming I/O requests and other workload data. In one aspect, the data collection module 107 interfaces with the management application 111 and provides collected data for analysis, as described herein.

Figure 2A:
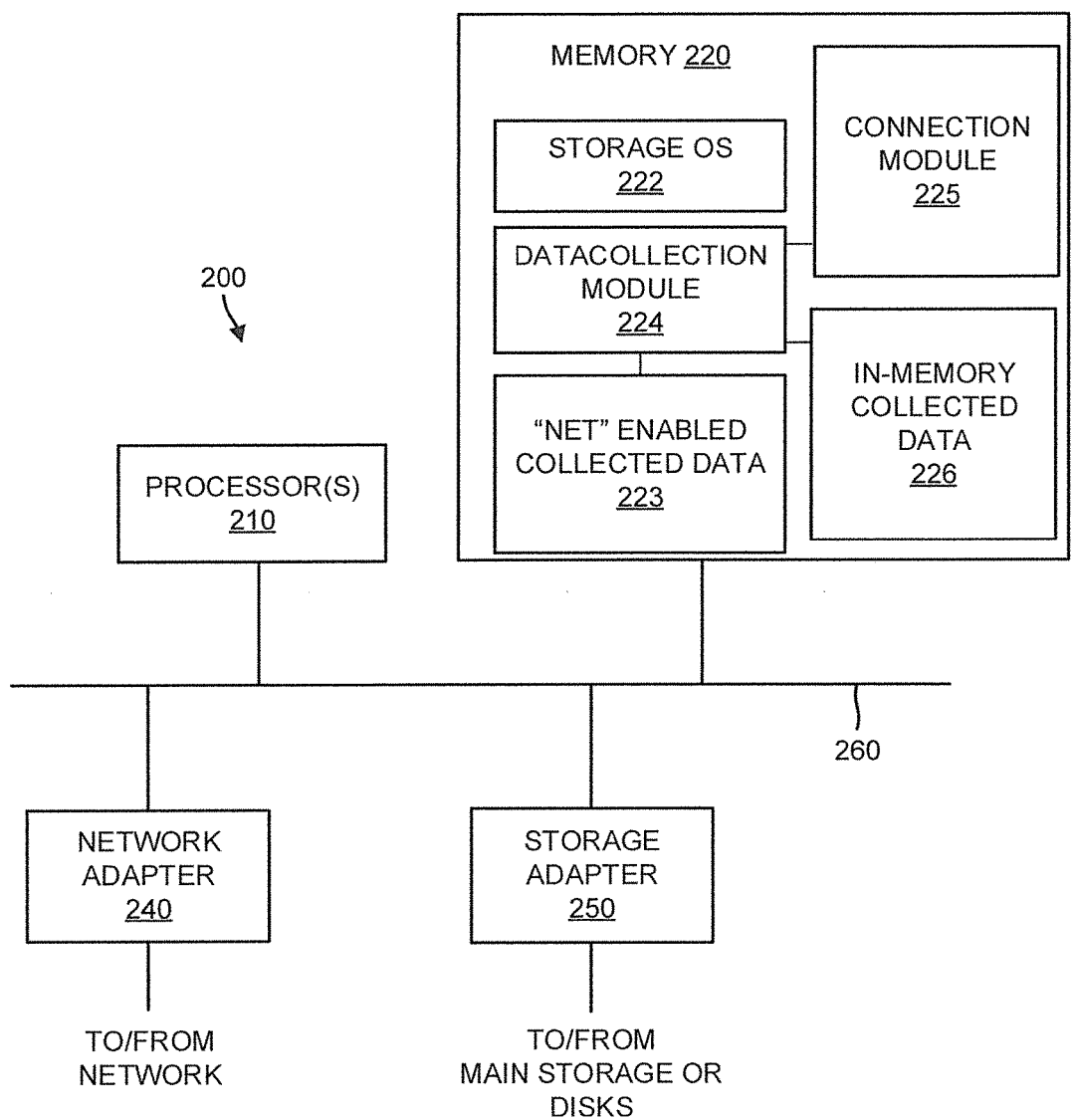
FIG. 2A is a block diagram illustrating an example of a storage server used according to the various aspects of the present disclosure.

Storage Controller: FIG. 2A is a block diagram illustrating an example of the architecture of a storage controller 200 that can implement one or more network storage servers, for example, storage server 108 of FIG. 1. As described above, the storage server 108 is a processing system that provides storage services relating to the organization of information at storage devices 112 of the mass storage subsystem 105. In an illustrative aspect, the storage controller 200 includes a processor subsystem 210 that includes one or more processors. The storage controller 200 further includes a memory 220, a network adapter(s) 240, and a storage adapter(s) 250, at least some of which can be interconnected by an interconnect 260, e.g., a physical interconnect. Interconnect 260 may include a bus, for example.

The interconnect 260 is an abstraction that represents any one or more separate physical buses, point-to-point connections, or both, connected by appropriate bridges, adapters, or controllers. The interconnect 260, therefore, may include, for example, a system bus, a form of Peripheral Component Interconnect Express(PCIe) bus, a HyperTransport or industry standard architecture (ISA) bus, a small computer system interface (SCSI) bus, a universal serial bus (USB), TIC (12C) bus, or an Institute of Electrical and Electronics Engineers (IEEE) standard 1394 bus, also called "Firewire," FibreChannel, Thunderbolt, and/or any other suitable form of physical connection including combinations and/or variations thereof.

The memory 220 illustratively comprises storage locations that are addressable by the processor(s) 210 and adapters 240 and 250 for storing software program code and data associated with the technology introduced here. For example, some of the storage locations of memory 220 can be used to store a storage operating system (may also be referred to as controller firmware) 222 that preferably implements a high-level module, called a storage manager, to logically organize data as a hierarchical structure of named volumes, directories, files, and/or data "blocks" on the storage devices 112. A block can be a sequence of bytes of specified length.

Additionally, the memory may include a data collection module 224 (similar to data collection module 107, FIG. 1) and a connection module 225. In another aspect, data collection module 224 and the connection module 225 are integrated into a single module. In one aspect, these modules comprise computer instructions to carry out the various aspects of the systems and methods described herein. For example, the connection module 225 communicates with the network adapter 240 and manages one or more connections for communicating I/O (input/output) operations or trace data for evaluation. In one aspect, the data collection module 224 may collect or store net-enabled collected data 223 and in-memory collected data 226.

In one aspect, the collected data includes I/O statistics data—i.e., for example, the number of read and write requests, the number of I/O operations serviced from a cache, or other statistics relating to the handling of I/O operations by the storage server. In one aspect, the collected data includes I/O trace data—i.e., for example, a list of I/O commands including source and target data or other metadata related to the commands, such as a sequence identifier. I/O trace data generally will not include data payloads of the I/O commands. I/O trace data may also be referred to as I/O messaging data herein.

In one aspect, memory collected data 226 is collected regardless of the net-enabled collected data, whereas net-enabled collected data 223 is collected when a client has established a network connection, as described below. Net-enabled collected data 223 may be stored at a memory buffer before being sent over a network connection as described herein.

In one aspect, the data collection module 224 may store I/O messaging data as net-enabled collected data 223 and in-memory collected data 226 utilizing double buffering or other multi-buffering techniques. It is also noteworthy that in one aspect, the data collection module 224 may only manage one data collection, such as in-memory collected data 226, but still use the data for different functions as described herein for the net-enabled collected data 223 and in-memory collected data 226, for example.

In one aspect, some or all of the storage operating system 222, data collection module 224, connection module 225, and the collected datas 223, 224 may be stored in long term storage either resident on the storage controller 200 (not shown) or in, for example, the connected mass storage subsystem 105. Portions—or all—of these modules and data can then be loaded into memory 220 for operation by the processor(s) 210, for example.

The storage operating system 222, portions of which are typically resident in memory and executed by the processing elements, functionally organizes the storage server 108 by (among other functions) invoking storage operations in support of the storage service provided by the storage server 108. It will be apparent to those skilled in the art that other processing and memory implementations, including various other non-transitory media, e.g., computer readable media, may be used for storing and executing program instructions pertaining to the technology introduced here. In one aspect, the storage operating system 222 can be distributed, with modules of the storage system running on separate physical resources.

The network adapter 240 may include multiple ports to couple the storage server 108 with one or more clients 104, one or more management consoles 110, or other storage servers, over point-to-point links, wide area networks, virtual private networks implemented over a public network (e.g., the Internet) or a shared local area network. One of the ports may be used to communicate with management console 110 for sending data collected by data collection module 224 (in one aspect, net-enable collected data 223).

The network adapter 240 includes mechanical components as well as the electrical and signaling circuitry needed to connect the storage server 108 to the network 106. Illustratively, the network 106 can be embodied as an Ethernet network, a Fibre Channel network or any other network type. Each client 104 can communicate with the storage server 108 over the network 106 by exchanging packets or frames of data according to pre-defined protocols, e.g., Transmission Control Protocol/Internet Protocol (TCP/IP). It is noteworthy that clients 104 may be coupled to the storage server 108 directly without having to go through a network adapter or network 106. The various aspects described herein are not limited to a network or a direct connection.

The storage adapter 250 cooperates with the storage operating system 222 to access information requested by clients 104. The information may be stored on any type of attached array of writable storage media, e.g., magnetic disk or tape, optical disk (e.g., CD-ROM or DVD), flash memory, SSD, HDD, SSHD, RAM, micro-electro mechanical and/or any other similar media adapted to store information, including data and data protection information. However, as illustratively described herein, the information is stored on storage devices 112. The storage adapter 250 includes multiple ports having I/O interface circuitry that couples with the disks over an I/O interconnect arrangement, e.g., a conventional high-performance, Fibre Channel link topology or Serial Attached SCSI (SAS) topology.

The storage operating system 222 facilitates clients' access to data stored on the storage devices 112. In certain aspects, the storage operating system 222 implements a write-anywhere file system that cooperates with one or more virtualization modules to "virtualize" the storage space provided by storage devices 112. In certain aspects, a storage manager element (for example, 410, FIG. 4) of the storage operation system 222 logically organizes the information as a hierarchical structure of named directories and files on the storage devices 112. Each "on-disk" file may be implemented as a set of disk blocks configured to store information. As used herein, the term "file" means any logical container of data. The virtualization module(s) may allow the storage manager 410 to further logically organize information as a hierarchical structure of blocks on the disks that are exported as named logical units.

Figure 2B:
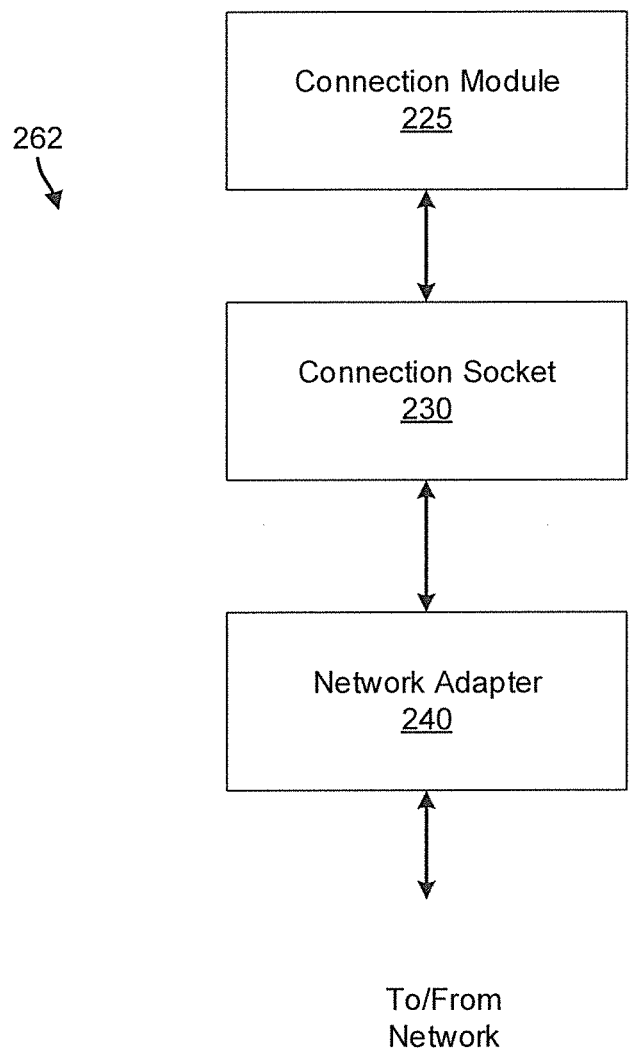
FIG. 2B illustrates a schematic for generating a network connection used according to the various aspects of the present disclosure.

As set forth generally above, the storage server 108 can capture I/O trace information and provide it to a management console 110, management application 111, or a client 104 by connecting through a network connection. In one aspect, the connection module 225 executed by or interfacing with the storage server 108 manages these connections. A connection hierarchy 262 that may carry out the connection and data transfer tasks, in one aspect, is illustrated in FIG. 2B.

Connection module 225 works uses a connection socket 230 to establish a communications link through network adapter 240 port. Connection socket 230, in one aspect, is characterized by the storage server 108's IP (Internet Protocol or any other address type) address and a port number of the network adapter 240 port and listens for connection requests from, for example a client 104 or the management console 110. In one aspect, the connection socket 230 uses a dedicated management network port for sending collected data. In general, the connection socket will follow a specific transport protocol, such as, for example the TCP/IP protocol. However, it will be understood that other protocols may also be utilized in carrying out the teachings described herein.

When a request for a connection comes in through the network adapter 240, the connection socket 230 accepts the request. In some aspects, the connection manager 225 may start a new connection socket 230 so that it can continue to listen for additional connection requests. The use of connection socket 230 and the hierarchy of FIG. 2B is described below with respect to the process flow if FIG. 3.

Figure 3:
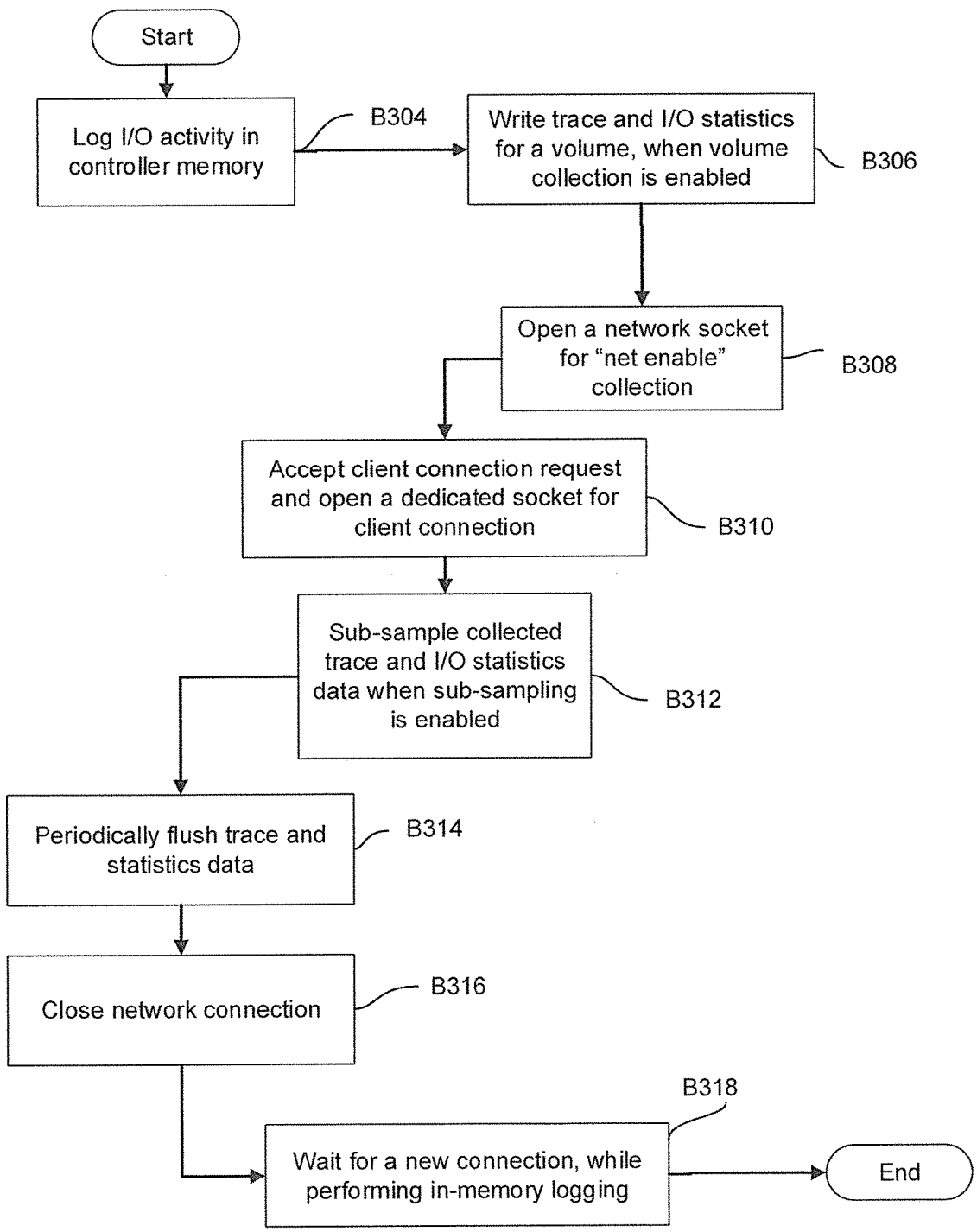
FIG. 3 shows a data collection process flow according to the various aspects of the present disclosure.

Data Collection Process: In FIG. 3, an example process for collecting data by the data collection module 224 is described. The process starts with the storage server 108 configured and operational with the data collection module 224 and a connection module 225 operating thereon.

At block B304, the data collection module 224 begins collecting (or logging) I/O activity data in memory 220 as in-memory collected data 226. In one aspect, the I/O activity data may comprise I/O trace data, including, in one aspect, data identifying a sequence of I/O operations issued to the controller 200 (or storage server 108) and the responses for the I/O operations.

At block B306, trace and I/O statistics are written for a storage volume, when volume collection is enabled. Statistics may include, in one aspect, performance data, such as, for example, IOPS (number of input/output operations that are processed per second), CPU utilization, cache statistics, and the like. Other relevant statistics that can be derived from the I/O activity may also be stored and/or reported in various aspects. In one aspect, the I/O statistics data may be obtained from the storage operating system 222.

Volume collection is an optional feature, which when enabled is used to store I/O trace data and statistics for a storage volumes instead of sending them out on a network connection. This feature may be enabled via the management application. In one aspect, when volume collection is enabled, two additional volumes are created within persistent storage subsystem 105—one for I/O trace data and one for statistics data. This data may be buffered in memory, such as in-memory collected data 226 before transfer to the persistent storage subsystem via a storage connection or it may be transferred more immediately in various aspects. In-memory collected data 226, in one aspect, is overwritten to limit the amount of storage and resources that are required. In one aspect, the in-memory data is over-written after a threshold amount of data has been collected.

At block B308, the connection module 225 opens a network connection socket 230 to allow "net enable" collection. The network connection socket 230 "listens" for a connection request, such as from a management console 110. As an example, the network connection socket 230 is a logical entity that is maintained by connection module 225 to detect connection requests from an offload entity (for example, client system 104 and/or management console 110). The network connection socket 230 structure may be defined by a transport protocol that is used by the network adapter 240 to communicate via network 106, for example, the TCP protocol.

At block B310, the network connection socket 230 accepts a connection request from the offload entity, to connect to the storage server 108 via the network 106. A dedicated socket for the requested connection is opened, for example, a TCP socket. In one aspect, a client system 104; the management console 110 or any other attached computer system may connect via network 106 or any other means. Once the connection is established, the connection module 225 can begin sending captured I/O trace data across the socket connection (as described below with respect to block B314).

In one aspect, collected data is stored at one or more memory buffers at memory 220. The connection module 225 may overrun the buffers and the data collection module 107 may drop information if the collected data is not processed immediately i.e. the socket is not drained efficiently. To mitigate this problem, in block B312, the collected I/O trace data can be sub-sampled when enabled. Sub-sampling means that only a certain subset of I/O operations and responses are maintained as I/O trace data at memory buffers, while others are ignored or dropped during processing.

In one aspect, the I/O trace data can be sub-sampled by masking a sequence identifier (ID) value for I/O operations. Each I/O operation includes or is assigned a sequence ID that allows the storage server 108 to associate a response to an original I/O request. As an example, in one aspect, a sequence ID may also be associated with I/O operations for packet ordering when transmissions across a network may not ensure that I/O packets arrive together or are in a proper order. In this way, both requests and replies for I/O operations are captured (or dropped) which helps to ensure more usable I/O trace data. Masking the sequence ID is also useful in that the requests and replies can both be captured without a look-up operation being needed. That reduces processing burdens on the data collection module 224 and thus the storage server 108 as a whole. In various aspects, the subsampling can reduce data trace size by $2^n$. It has been found that subsampling with a sequence masking in this manner can still preserve sequence patterns at least when $n<=3$. As such, in one aspect, subsample tracing can be reduced as much as 8 times, while still preserving I/O sequence patterns and providing high quality trace data for the management console's evaluation.

At block B314, the connection module 225 begins sending the captured I/O traffic-synchronously. With a network connection established, the data collection module 224 may save the trace data as "net-enabled" collected data 223, which may be the data sent by the connection module 225. In one aspect, this may be a net flush operation which empties existing I/O trace data and statistics data in an active buffer and then sends the data via the network. This data may be sent periodically within a defined time interval (for example, every 2 minutes), allowing some build-up of the net-enabled collected data 223 in memory 220. In other aspects, the collected data 223 is streamed to the client or management console with limited or no delay. The management console 110 or other connected device can then save the I/O trace data and use it to test the storage server 108 performance, determine efficiencies and how the system might be better configured, for example. In one aspect, statistics data may also be flushed across the network connection.

In one aspect, the client can store the trace/statistics data 223 in a system readable file that can be exchanged via standard methods to other systems for archival purposes. This allows the trace data to be used as needed for replay as well as analysis. The client can also analyze the data in real time in an environment that is more suited for processing.

In one aspect, at block B316, the connection module 225 closes the connection socket on which the I/O trace data is being transmitted. This may be based on a "close" command from the client, a "net disable" command from a system administrator, or the like. In one aspect, the socket 230 may remain open or be reopened to listen for other connections.

At block B318, the data collection module 224 collects in-memory data 226 (also referred to as in-memory logging), while waiting for a new network connection.

This data collection process produces a number of advantages for storage systems. It allows real-time capture of I/O trace data and near real time testing of storage system settings using real world, production data with little to no impact on an in-production storage server 108. As described, the process uses I/O trace data rather than full I/O commands with payloads to reduce processing and network traffic, yet push computationally intensive tasks off the storage server to the management console or other interested client system. System managers can use real production I/O workload data to more accurately plan for storage server capacities, troubleshooting, and quality of service evaluations.

Figure 4:
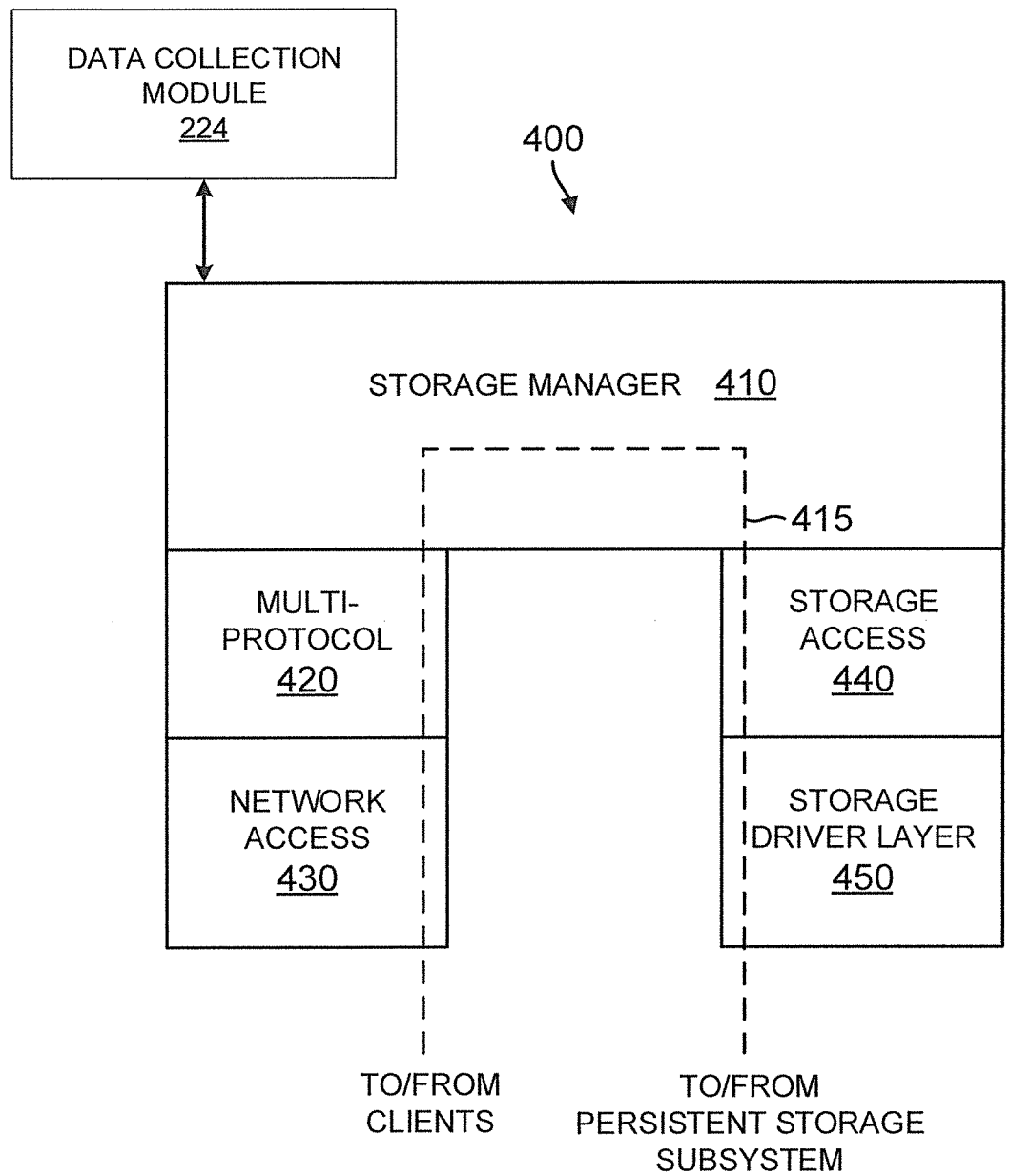
FIG. 4 shows an example of a storage operating system architecture used, according to the various aspects of the present disclosure.

Storage Operating System: FIG. 4 is a schematic diagram illustrating an example of the architecture 400 of the storage operating system 222 for use at the storage server 108. In some aspects, the storage operating system 222 can include NetApp® E-Series controller firmware or the NetApp® Data ONTAP® operating system available from NetApp, Inc., Sunnyvale, Calif. that implements a Write Anywhere File Layout (WAFL®) file system (without derogation of any trademark rights). However, another storage operating system may alternatively be designed or enhanced for use in accordance with the technology described herein. The data collection module 224 may comprise a portion of storage operating system 222 or an application interfacing with the storage operating system. In one aspect, the storage operating system 222 generates and maintains I/O performance statistics described above and provides them to the data collection module 224.

The storage operating system 222 can be implemented as programmable circuitry programmed with software and/or firmware, or as specially designed non-programmable circuitry (i.e., hardware), or in a combination and/or variation thereof. In the illustrated aspect, the storage operating system 222 includes several modules, or layers. These layers include a storage manager (or file system manager) 410, which is a functional element of the storage operating system 222. The storage manager 410 imposes a structure (e.g., one or more file systems) on the data managed by the storage server 108 and services read and write requests from clients 104. In one aspect, the data collection module 224 interacts with the storage manager 410 layer of the storage operating system 222 to see I/O request and response traffic.

To allow the storage server to communicate over the network 106 (e.g., with clients 104), the storage operating system 222 can also include a multi-protocol layer 420 and a network access layer 430, logically under the storage manager 410. The multi-protocol layer 420 implements various higher-level network protocols, e.g., Network File System (NFS), Common Internet File System (CIFS), Hypertext Transfer Protocol (HTTP), Fibre Channel, Infini-Band, Serial Attached Small Computer System Interface (SAS) and/or Internet small computer system interface (iSCSI), to make data stored on the storage devices 112 available to users and/or application programs. The network access layer 430 includes one or more network drivers that implement one or more lower-level protocols to communicate over the network, e.g., Ethernet, Internet Protocol (IP), TCP/IP, Fibre Channel Protocol and/or User Datagram Protocol/Internet Protocol (UDP/IP).

Also, to allow the device to communicate with a storage subsystem (e.g., storage subsystem 105 of FIG. 1), the storage operating system 222 includes a storage access layer 440 and an associated storage driver layer 450 logically under the storage manager 410. The storage access layer 440 implements a higher-level storage redundancy algorithm, e.g., RAID-4, RAID-5, RAID-6, or RAID DP®. The storage driver layer 450 implements a lower-level storage device access protocol, e.g., Fibre Channel Protocol or SAS.

Also shown in FIG. 4 is the path 415 of data flow through the storage operating system 222, associated with a read or write operation, from the client interface to the storage interface. Thus, the storage manager 410 accesses a storage subsystem, e.g., storage system 105 of FIG. 1, through the storage access layer 440 and the storage driver layer 450. Clients 104 can interact with the storage server 108 in accordance with a client/server model of information delivery. That is, the client 104 requests the services of the storage server 108, and the storage server may return the results of the services requested by the client, by exchanging packets over the network 106. The clients may issue packets including file-based access protocols, such as CIFS or NFS, over TCP/IP when accessing information in the form of files and directories. Alternatively, the clients may issue packets including block-based access protocols, such as iSCSI and SCSI, when accessing information in the form of blocks.

In one aspect, the data collection module 224 "listens" to the read and write operation path 415 to gather trace data for the I/O operations and responses. This trace data can then be passed through multi-protocol 420 and network access 430 as net-enabled collected data 223. In another aspect, the data collection module 224 makes a copy of the I/O requests and responses and may then send them in bulk through multi-protocol 420 and network access 430 to send them over a network socket connection to a tracking client or management console as described herein.

Figure 5:
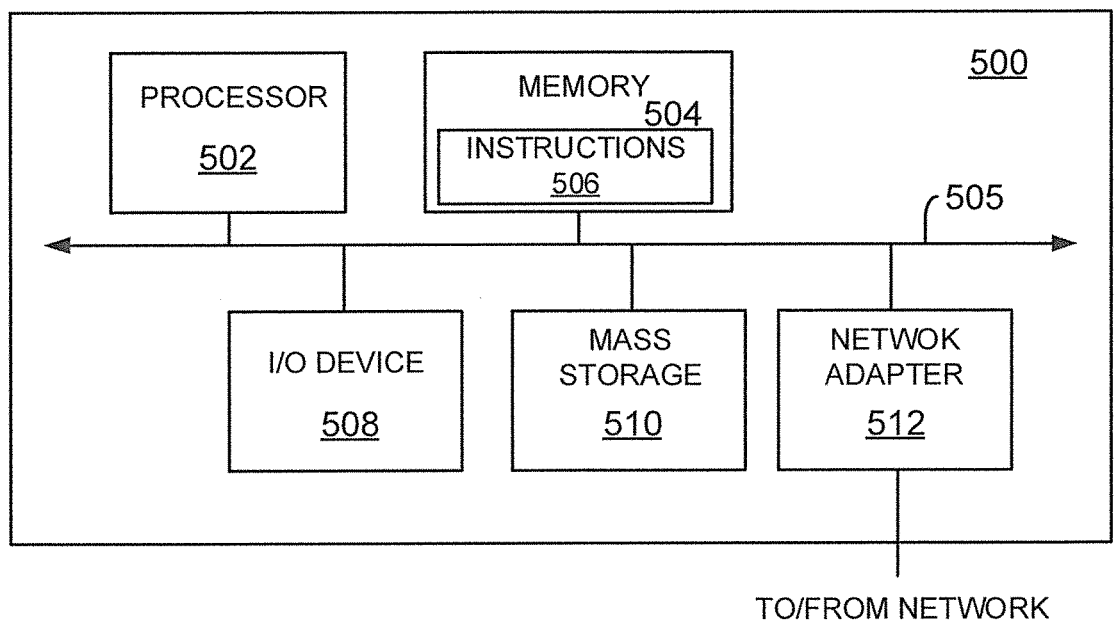
FIG. 5 is a block diagram of a computer system used in the various aspects of the present disclosure.

Computer System 500: FIG. 5 illustrates a computer architecture for a computer system 500 that may be used for client systems 104 and/or management console 110 in various aspects. Computer system 500 includes at least one processor 502, a memory 504, at least one I/O device 508, a mass storage device 510, and a network adapter 512 interconnected by an interconnect 505, e.g., a physical interconnect. Interconnect 505 may include a bus, for example, similar to interconnect 260 as described above.

In one aspect, memory 504 illustratively comprises storage locations that are addressable by the processor 502 and network adapter 512 for storing software program code (instructions 506) and data. For example, instructions 506 may comprise an application 103 of a client system 104 or a management application 111 of a management console 110. In one aspect, the at least one I/O devise comprises a display, a keyboard, a mouse, speakers, or the like for accepting input from or presenting output to a user, such as a network administrator. As such, most computer systems 500 are likely to have multiple I/O devices 508.

As described with reference to the storage server and persistent storage subsystem, the mass storage 510 may be any of a variety of volatile or non-volatile memory devices, such as HDDs, SSDs, or the like for storing data. Additionally the network adapter 512 enables communications across a network, such as starting and ending socket connections with the storage server 108 for tracing I/O data as described herein.

The processes described herein are organized as sequences of operations in the flowcharts. However, it should be understood that at least some of the operations associated with these processes potentially can be reordered, supplemented, or substituted for, while still performing the same overall technique.

The technology introduced above can be implemented by programmable circuitry programmed or configured by software and/or firmware, or they can be implemented entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the technology introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc. The term "logic", as used herein, can include, for example, special-purpose hardwired circuitry, software and/or firmware in conjunction with programmable circuitry, or a combination thereof.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method comprising:
opening, by a storage server, a network socket for listening to a connection request from a computing device;
accepting, by the storage server, the connection request from the computing device over the network socket;
enabling, by the storage server, selective data collection based on a network connection with the computing device over the network socket, where the selective data collection includes obtaining: (i) I/O trace data comprising information regarding a plurality of input/output (I/O) requests and responses and (ii) performance information of the storage server for processing the I/O requests;
sub-sampling, by the storage server, the obtained I/O trace data, the sub-sampling including maintaining a subset of the obtained I/O trace data in a memory buffer and dropping a second subset of the obtained I/O trace data; and sending, by the storage server, at least a portion of the sub-sampled I/O trace data over the network socket connection to the computing device.

2. The method of claim 1, wherein sub-sampling the network connection based collected data includes:
filtering the network connection based collected data by masking sequence identifiers (ID) associated with the plurality of I/O requests and responses.

3. The method of claim 1, further comprising:
continuing to collect data after the network connection is closed; and
overwriting at least a portion of the data collected after the network connection is closed, when a threshold amount of the data collected has been buffered and there is no connection over the network socket.

4. The method of claim 1, wherein the network connection socket is a transmission control protocol (TCP) socket.

5. The method of claim 1, further comprising:
enabling volume-based data collection for collecting information regarding a plurality of input/output (I/O) requests and responses and performance information of the storage server related to a specific storage volume; and
sending at least a portion of the volume-based collected data to a storage subsystem.

6. The method of claim 1, wherein the sending at least a portion of the network connection based collected data over the network socket connection occurs at or within a time interval.

7. The method of claim 1, wherein the portion of the network connection based collected data is sent via a dedicated management network port of the storage server.

8. A non-transitory machine readable storage medium having stored thereon instructions for performing a method comprising machine executable code which when executed by at least one machine, causes the machine to:
open a network socket for listening to a connection request from a computing device;
accept the connection request from the computing device over the network socket;
enable selective data collection based on a network connection with the computing device over the network socket, where the network connection based selective data collection includes obtaining: (i) I/O trace data comprising information regarding a plurality of input/output (I/O) requests and responses and (ii) performance information of the machine for processing the I/O requests;
sub-sample the obtained I/O trace data, the sub-sampling including maintaining a subset of the obtained I/O trace data in a memory buffer and dropping a second subset of the obtained I/O trace data; and
send at least a portion of the sub-sampled I/O trace data over the network socket connection to the computing device.

9. The non-transitory machine readable storage medium of claim 8, further comprising machine executable code that causes the machine to:
filter the network connection based collected data by masking sequence identifiers (ID) associated with the plurality of I/O requests and responses.

10. The non-transitory machine readable storage medium of claim 8, further comprising machine executable code that causes the machine to:
continue to collect data after the network connection is closed; and
overwrite at least a portion of the data collected after the network connection is closed, when a threshold amount of the data collected has been buffered and there is no connection over the network socket.

11. The non-transitory machine readable storage medium of claim 8, wherein the network connection socket is a transmission control protocol (TCP) socket.

12. The non-transitory machine readable storage medium of claim 8, further comprising machine executable code that causes the machine to:
enable volume-based data collection for collecting information regarding a plurality of input/output (I/O) requests and responses and performance information related to a specific storage volume; and
send at least a portion of the volume-based collected data to a storage subsystem.

13. The non-transitory machine readable storage medium of claim 8, wherein the sending at least a portion of the network connection based collected data over the network socket connection occurs at or within a time interval.

14. The non-transitory machine readable storage medium of claim 8, wherein the portion of the network connection based collected data is sent via a dedicated management network port of the machine.

15. A computing device comprising:
a memory containing machine readable medium comprising machine executable code having stored thereon instructions for performing a method of reducing a workload of the computing device in data collection; and
a processor coupled to the memory, the processor configured to execute the machine executable code to cause the processor to:
open a network socket for listening to a connection request from a monitoring computing device;
accept the connection request from the monitoring computing device over the network socket;
enable selective data collection based on a network connection with the monitoring computing device over the network socket, where the selective data collection includes obtaining: (i) I/O trace data comprising information regarding a plurality of input/output (I/O) requests and responses and (ii) performance information of the computing device for processing the I/O requests;
sub-sample the obtained I/O trace data, the sub-sampling including maintaining a subset of the obtained I/O trace data in a memory buffer and dropping a second subset of the obtained I/O trace data; and
send at least a portion of the sub-sampled I/O trace data over the network socket connection to the monitoring computing device.

16. The computing device of claim 15, wherein the processor is further configured to:
filter the network connection based collected data by masking sequence identifiers (ID) associated with the plurality of I/O requests and responses.

17. The computing device of claim 15, wherein the processor is further configured to:
continue to collect data after the network connection is closed; and
overwrite at least a portion of the data collected after the network connection is closed, when a threshold amount of the data collected has been buffered and there is no connection over the network socket.

18. The computing device of claim 15, wherein the network connection socket is a transmission control protocol (TCP) socket.

19. The computing device of claim 15, wherein the processor is further configured to:
- enable volume-based data collection for collecting information regarding a plurality of input/output (I/O) requests and responses and performance information of the computing device related to a specific storage volume; and
- send at least a portion of the volume-based collected data to a storage subsystem.

20. The computing device of claim 17, wherein the sending at least a portion of the network connection based collected data over the network socket connection occurs at or within a time interval.

* * * * *